(12) United States Patent  
Lau et al.

(10) Patent No.: US 8,812,964 B2  
(45) Date of Patent: Aug. 19, 2014

(54) MANAGING EVELOPMENT OF AN ENTERPRISE APPLICATION

(75) Inventors: Shelley Lau, Scarborough (CA); Martin Leclerc, Toronto (CA)

(73) Assignee: International Business Machines Corporation, Armonk, NY (US)

(*) Notice: Subject to any disclaimer, the term of this patent is extended or adjusted under 35 U.S.C. 154(b) by 578 days.

(21) Appl. No.: 10/907,412

(22) Filed: Mar. 31, 2005

(65) Prior Publication Data

US 2006/0225028 A1    Oct. 5, 2006

(51) Int. Cl.
   *G06F 3/00*    (2006.01)

(52) U.S. Cl.
   USPC .......................................................... 715/762

(58) Field of Classification Search
   CPC ........................................................ G06F 8/34
   USPC ............................ 717/102; 715/762–763, 826
   See application file for complete search history.

(56) References Cited

U.S. PATENT DOCUMENTS

| | | | |
|---|---|---|---|
| 6,061,517 A * | 5/2000 | House et al. | 717/115 |
| 6,493,868 B1 | 12/2002 | DaSilva et al. | |
| 6,738,964 B1 * | 5/2004 | Zink et al. | 717/105 |
| 6,748,380 B2 * | 6/2004 | Poole et al. | 707/9 |
| 6,792,595 B1 | 9/2004 | Storistenau et al. | |
| 7,069,553 B2 * | 6/2006 | Narayanaswamy et al. | 717/173 |
| 7,076,766 B2 * | 7/2006 | Wirts et al. | 717/121 |
| 2003/0041311 A1 * | 2/2003 | Poole et al. | 717/100 |
| 2003/0221184 A1 * | 11/2003 | Gunjal et al. | 717/118 |
| 2004/0003371 A1 | 1/2004 | Coulthard et al. | |

* cited by examiner

*Primary Examiner* — Enrique Iturralde

(74) *Attorney, Agent, or Firm* — Steven M. Greenberg, Esq.

(57) ABSTRACT

An improved solution for managing development of a multi-tiered enterprise application. In particular, a plurality of logical tiers for the enterprise application are identified and a corresponding set of components for each of the logical tiers is obtained. An enterprise application view is generated based on the logical tiers and sets of components to provide an end-to-end graphical view of the enterprise application. The enterprise application view can be integrated with various development tools that are used to develop the components for the enterprise application. To this extent, the invention can automatically integrate component development artifacts for deployment. As a result, the invention can provide a truly integrated development environment for developing the enterprise application.

20 Claims, 4 Drawing Sheets

MANAGING EVELOPMENT OF AN ENTERPRISE APPLICATION

TECHNICAL FIELD

This invention relates generally to developing an enterprise application, and more particularly, to a method and system for integrating various development tools for the enterprise application.

BACKGROUND ART

An enterprise application, such as an end-to-end enterprise business application, is a complex application that comprises multiple tiers and subsystems of various technologies that include more than computer program code (e.g., Java). Typically, the enterprise application will comprise at least a presentation tier, a business logic tier, and a data/Enterprise information system (EIS) access tier. The data/EIS access tier provides connectivity to various back end services. Each tier will generally include one or more components that provide necessary functionality. To this extent, creating the enterprise application requires expertise from several areas.

In general, each component is developed independently by an expert and/or team of experts for the particular component. This development is frequently aided by the use of one of many off-the-shelf Integrated Development Environments (IDEs). For example, the WebSphere Studio Application Developer Integration Edition (WSAD-IE) offered by International Business Machines Corp. (IBM) of Armonk, N.Y., includes a strut web diagram editor for modeling presentation flow, a WSAD-IE Process Editor for modeling business process execution language (BPEL)-based business processes, and other editors, such as an extensible markup language (XML) editor and a Java editor, for other purposes. However, WSAD-IE and other similar IDEs do not provide a tool-assisted mechanism to combine the components developed for the construction of the multi-tiered enterprise application at build time.

Increasingly, it is desirable to integrate disparate middleware applications, and in response, IDEs have incorporated the disparate development tools for these applications. However, no progress has been made in the interoperability of these disparate development tools. To this extent, many development tools are developed with their purpose and scope limited to the particular application, without regard to other development tools and a possibility of interoperability with these other development tools. As a result, a developer frequently needs to switch between multiple development tools to develop the components and later manually integrate the components. This disparity and limited interaction between development tools hinders the productivity and efficiency in the development of the enterprise application. Further, the IDE does not provide a "big picture" (e.g., end-to-end) view of the architecture of the enterprise application.

To this extent, a need exists for an improved method, system, and IDE for managing development of an enterprise application that generate a complete view of the architecture of the enterprise application and/or improve interaction between the various disparate development tools used to develop the enterprise application.

SUMMARY OF THE INVENTION

The invention provides an improved solution for managing development of an enterprise application. In particular, a plurality of logical tiers for the enterprise application are identified and a corresponding set of components for each of the logical tiers is obtained. An enterprise application view is generated based on the logical tiers and sets of components to provide an end-to-end graphical view of the enterprise application. Additionally, the enterprise application view can be integrated with various development tools to provide a complete development environment for the user(s). Moreover, the invention can automatically integrate component development artifacts for deployment. To this extent, in one embodiment, the invention provides an improved integrated development environment (IDE) for developing an enterprise application. As a result, the invention provides a solution that enables each user to readily navigate and view different components of an enterprise application making the development, maintenance and/or understanding of the enterprise application easier and more cost efficient.

A first aspect of the invention provides a method of managing development of an enterprise application, the method comprising: identifying a plurality of logical tiers for the enterprise application; obtaining a unique set of components for each of the plurality of logical tiers; and generating an enterprise application view that includes a unique display area for each of the plurality of logical tiers, wherein each unique display area includes a set of objects that represent at least one of the corresponding unique set of components.

A second aspect of the invention provides a system for managing development of an enterprise application, the system comprising: a system/subsystem for identifying a plurality of logical tiers for the enterprise application; a system/subsystem for obtaining a unique set of components for each of the plurality of logical tiers; and a system/subsystem for generating an enterprise application view that includes a unique display area for each of the plurality of logical tiers, wherein each unique display area includes a set of objects that represent at least one of the corresponding unique set of components.

A third aspect of the invention provides an integrated development environment (IDE) stored on a computer-readable medium for enabling a computer infrastructure to manage development of an enterprise application, the IDE comprising: a system/subsystem for managing a plurality of logical tiers for the enterprise application; a system/subsystem for managing a plurality of components for the enterprise application, wherein each component comprises one of a plurality of component types and belongs to one of the plurality of logical tiers; a plurality of development tools, wherein each development tool manages development of a component having one of the plurality of component types; a system/subsystem for generating an enterprise application view based on the plurality of logical tiers and the plurality of components; and a system/subsystem for integrating each of the plurality of development tools with the enterprise application view.

A fourth aspect of the invention provides a program product stored on a computer-readable medium, which when executed, manages development of an enterprise application, the program product comprising: program code for identifying a plurality of logical tiers for the enterprise application; program code for obtaining a unique set of components for each of the plurality of logical tiers; and program code for generating an enterprise application view that includes a unique display area for each of the plurality of logical tiers, wherein each unique display area includes a set of objects that represent at least one of the corresponding unique set of components.

A fifth aspect of the invention provides a computer-readable medium that includes computer program code to enable a computer infrastructure to manage development of an enterprise application.

An sixth aspect of the invention provides a business method for managing development of an enterprise application.

A seventh aspect of the invention provides a method of generating a system for managing development of an enterprise application.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for managing development of an enterprise application. In particular, a plurality of logical tiers for the enterprise application are identified and a corresponding set of components for each of the logical tiers is obtained. An enterprise application view is generated based on the logical tiers and sets of components to provide an end-to-end graphical view of the enterprise application. Additionally, the enterprise application view can be integrated with various development tools to provide a complete development environment for the user(s). Moreover, the invention can automatically integrate component development artifacts for deployment. To this extent, in one embodiment, the invention provides an improved integrated development environment (IDE) for developing an enterprise application. As a result, the invention provides a solution that enables each user to readily navigate and view different components of an enterprise application making the development, maintenance and/or understanding of the enterprise application easier and more cost efficient.

Figure 1:
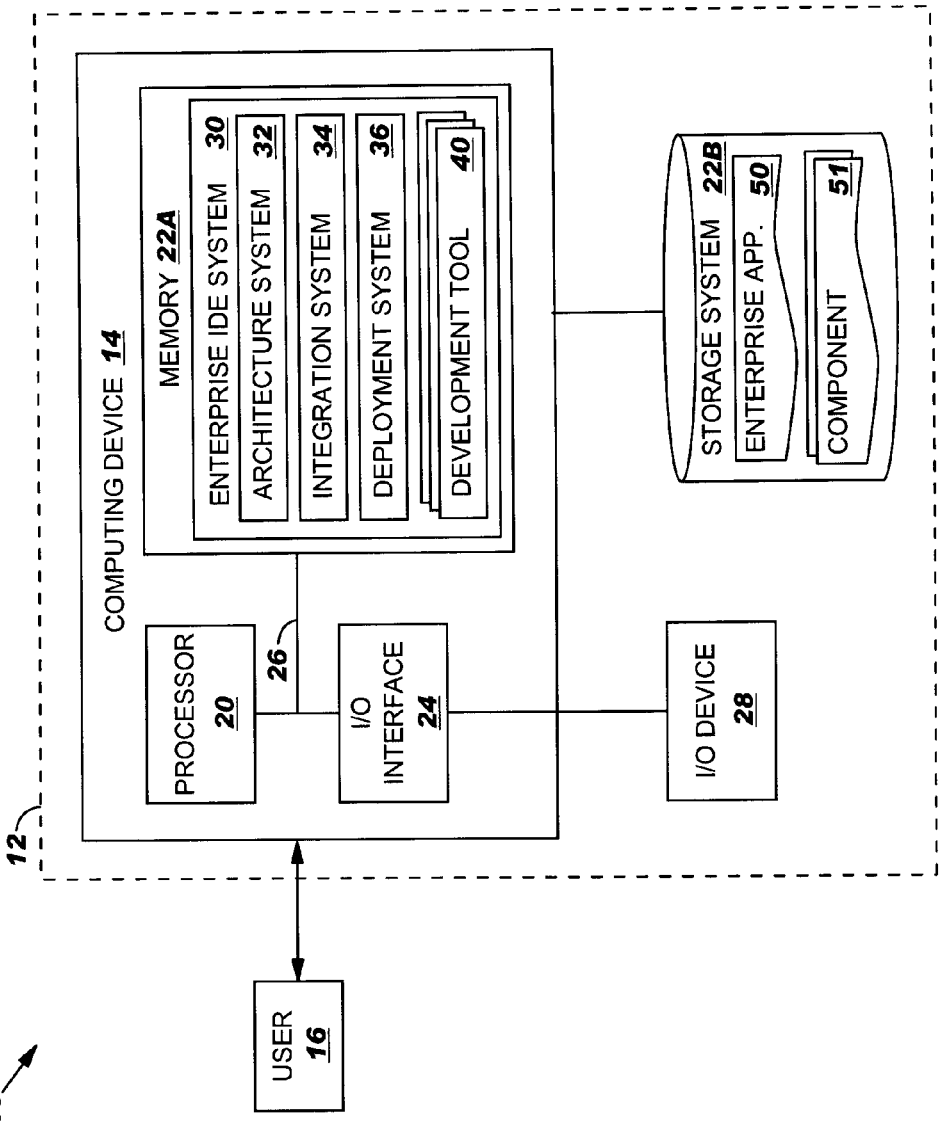
FIG. 1 shows an illustrative system for managing development of an enterprise application.

Turning to the drawings, FIG. 1 shows an illustrative system 10 for managing development of an enterprise application 50. To this extent, system 10 includes a computer infrastructure 12 that can perform the various process steps described herein for managing development of enterprise application 50. In particular, computer infrastructure 12 is shown including a computing device 14 that comprises an enterprise IDE system 30, which enables computing device 14 to manage development of enterprise application 50 by performing the process steps of the invention.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as enterprise IDE system 30, that is stored in memory 22A and/or storage system 22B. While executing computer program code, processor 20 can read and/or write data, such as enterprise application 50, to/from memory 22A, storage system 22B, and/or I/O interface 24. Bus 26 provides a communication link between each of the elements in computing device 14. I/O device 28 can comprise any device that enables user 16 to interact with computing device 14 or any device that enables computing device 14 to communicate with one or more other computing devices.

In any event, computing device 14 can comprise any general purpose computing article of manufacture capable of executing computer program code installed by a user 16 (e.g., a personal computer, server, handheld device, etc.). However, it is understood that computing device 14 and enterprise IDE system 30 are only representative of various possible equivalent computing devices that may perform the various process steps of the invention. To this extent, in other embodiments, computing device 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

Regardless, the invention provides an improved solution for managing development of enterprise application 50. To this extent, one embodiment of the invention comprises an enterprise IDE system 30. Enterprise IDE system 30 can comprise an application, such as an IDE, that enables a set of users 16 to manage development of components 51 and/or enterprise application 50 using computer infrastructure 12. For example, enterprise IDE system 30 can comprise the WebSphere Studio Application Developer Integration Edition offered by IBM. To this extent, enterprise IDE system 30 is shown including a set (one or more) of development tools 40, each of which manages development of one or more components 51 having a particular component type.

Further, enterprise IDE system 30 is shown including an architecture system 32 for generating an enterprise application view, an integration system 34 for integrating the set of development tools 40 with the enterprise application view, and a deployment system 36 for generating and deploying enterprise application 50. Operation of each of these systems is discussed further below. However, it is understood that some of the various systems shown in FIG. 1 can be implemented independently, combined, and/or stored in memory for one or more separate computing devices 14 that communicate over a network. Further, it is understood that some of the systems and/or functionality may not be implemented, or additional systems and/or functionality may be included as part of system 10. For example, the invention could comprise an "add on" application that enhances features of an existing IDE application that is sold apart from the invention.

Enterprise application 50 comprises a plurality of applications (components) for an enterprise (e.g., a business). In particular, enterprise application 50 can comprise both legacy applications that have been used by employees or others within the enterprise, legacy data stores that maintain various enterprise information, as well as new applications for exploiting new technology such as the Internet, e.g., e-commerce, providing electronic product information to the public, an extranet web site for customers, etc. To this extent, enterprise application 50 may comprise "middleware" application(s) that enable the new applications to interact with the legacy applications and/or data stores.

Figure 2:
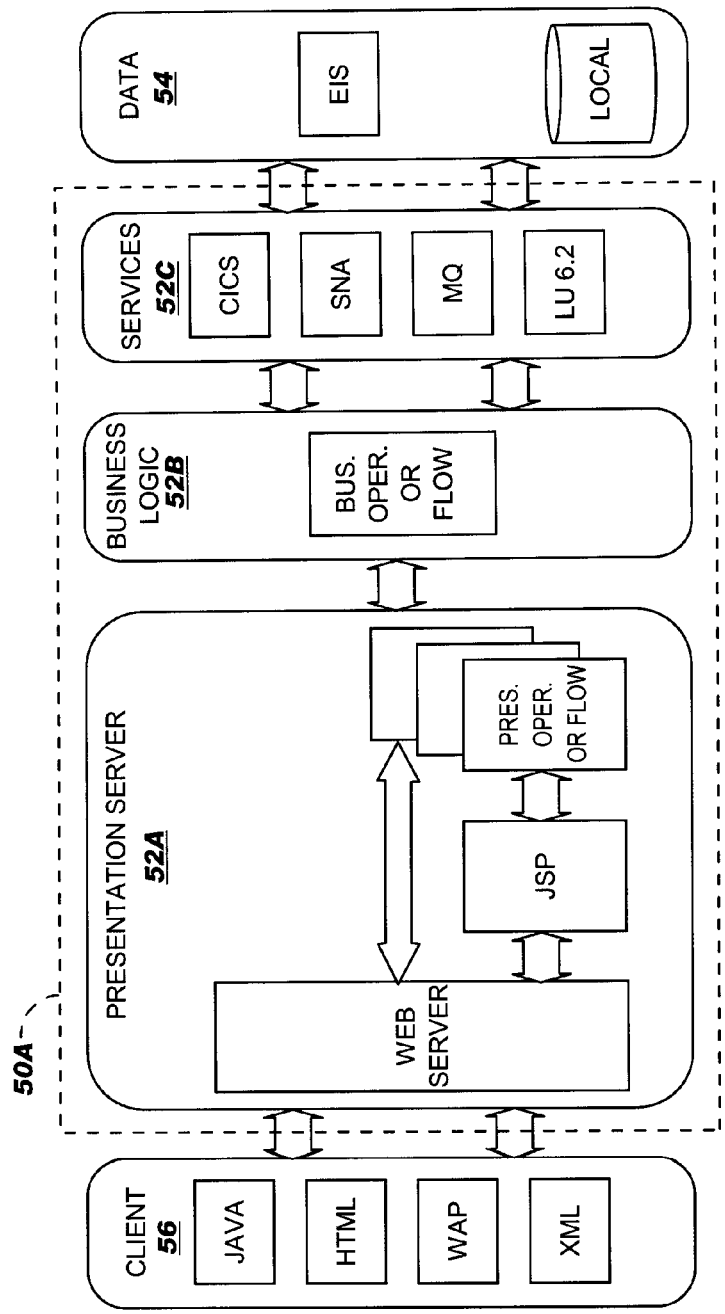
FIG. 2 shows an illustrative architecture for an enterprise application.

FIG. 2 shows an illustrative architecture for an enterprise application 50A. In particular, enterprise application 50A comprises a plurality of logical tiers 52A-C that enable client (s) 56 to request and receive enterprise data from one or more data storage systems 54. To this extent, enterprise application 50A is shown including a presentation server logical tier 52A, a business logic logical tier 52B and a services logical tier 52C. Services logical tier 52C can include one or more of various applications (e.g., a customer information control system (CICS), a systems network architecture (SNA) and/or one or more associated protocols such as LU 6.2, a message queue (MQ), etc.) that provide/receive data to/from one or more of various data storage systems 54 (e.g., an enterprise information system (EIS), local data, or the like). Business logic logical tier 52B can include one or more of various applications that interact with the services logical tier 52C and manage user-level operations and/or flows for various business operations. Presentation server logical tier 52A can comprise one or more of various applications that interact with business logic logical tier 52B and manage various user interfaces that are generated and provided for display to client (s) 56 using one or more of various display protocols (e.g., Java, hypertext markup language (HTML), extensible markup language (XML), wireless application protocol (WAP), etc.) with which client(s) 56 can generate data requests. As illustrated by presentation server logical tier 52A, one or more of the logical tiers 52A-C can also comprise a plurality of levels (e.g., presentation operation/flow interacts with a Java Server Page (JSP) server, which interacts with a web server).

Referring to FIGS. 1 and 2, enterprise IDE system 30 includes an architecture system 32 that manages the plurality of logical tiers 52A-C for enterprise application 50A. To this extent, architecture system 32 can identify each of the logical tiers 52A-C for enterprise application 50A. In one embodiment, architecture system 32 generates an interface that enables user 16 to identify logical tiers 52A-C. Alternatively, architecture system 32 can comprise a set of default logical tiers 52A-C that user 16 can subsequently alter by adding and/or removing one or more logical tiers 52A-C.

In any event, each logical tier 52A-C will comprise a unique set of one or more components 51. To this extent, architecture system 32 can further manage the various components 51 for enterprise application 50A. In particular, architecture system 32 can enable user 16 to add/remove one or more components 51 for enterprise application 50A. Each component 51 can comprise any type of information technology item that is used in generating enterprise application 50A. For example, a component 51 can comprise a set (one or more) of web pages, a database having one or more tables, a project that comprises a set of source code files for an application written in any programming language, etc. As a result, each component 51 may itself comprise a plurality of elements (e.g., source code files, tables, or the like).

Regardless, each component type will have a corresponding development tool 40 associated therewith that manages development of each component 51 having the corresponding component type. To this extent, each development tool 40 manages a set of editors that is used by user 16 when developing (e.g., creating, modifying, etc.) a component 51 having the corresponding component type. In particular, each development tool 40 can generate one or more editors that allow user 16 to view and/or modify a particular component 51 and/or one or more of its elements.

Figure 3:
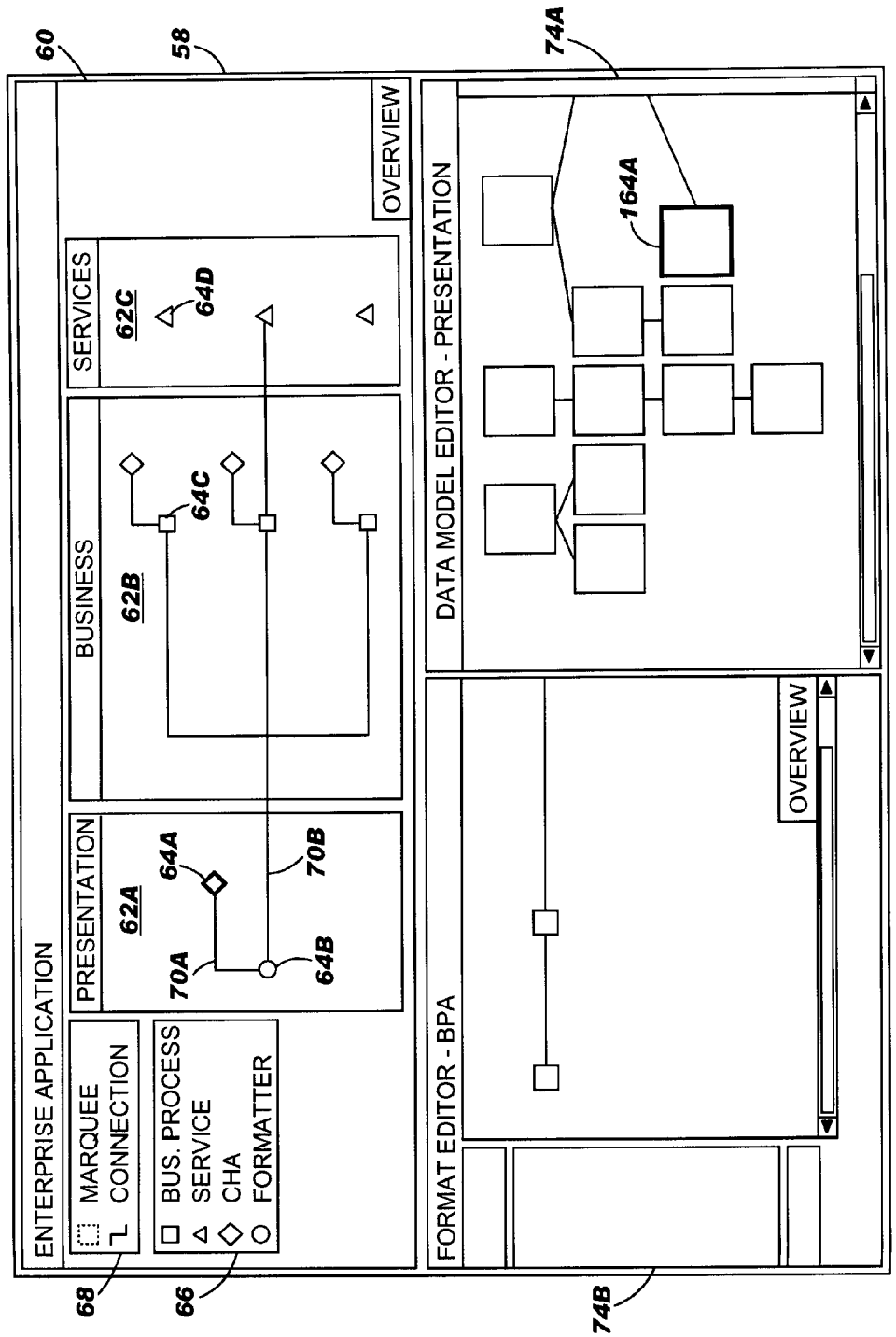
FIG. 3 shows an illustrative workbench according to one embodiment of the invention.

FIG. 3 shows an illustrative workbench 58 that can be generated by enterprise IDE system 30 (FIG. 1). Referring to FIGS. 1 and 3, workbench 58 enables a set of users 16 to develop enterprise application 50 in a top-down, bottom-up, and/or iterative manner. To this extent, workbench 58 can comprise an enterprise application view 60 and/or one or more editors 74A-B. Architecture system 32 generates enterprise application view 60 based on the plurality of logical tiers 52A-C (FIG. 2) and the plurality of components 51 for enterprise application 50. In particular, enterprise application view 60 comprises a unique display area 62A-C for each logical tier 52A-C (e.g., presentation, business, services). Within each display area 62A-C, such as display area 62A, enterprise application view 60 comprises a set of objects 64A-D, each of which represents a corresponding component 51 in the set of components 51 for the particular logical tier 52A-C. As noted above, the various components 51 for enterprise application 50 will comprise various component types. To this extent, architecture system 32 can use a unique object 64A-D to represent components 51 of each component type in enterprise application view 60. For example, enterprise application view 60 is shown having objects 64A-D of various shapes for each component type. However, it is understood that any solution for distinguishing component types can be used (e.g. more descriptive images, colors, or the like).

Additionally, enterprise application view 60 can comprise dependency data for one or more components 51. To this extent, architecture system 32 can obtain dependency data for one or more components 51 and add the dependency data to the corresponding objects 64A-D in enterprise application view 60. The dependency data can comprise, for example, a communications link between two components 51 that represents one component receiving and/or providing data from/to another component 51.

User 16 can use enterprise application view 60 to navigate and/or display information on one or more sets of related components 51 and/or elements of one or more components 51. To this extent, enterprise application view 60 can enable user 16 to "drill down" to view additional details of a selected set of components 51 and/or "drill out" to view higher level components 51. In each case, enterprise application view 60 can include a set of connections between components 51 from a start tier to an end tier that represent the flow and/or processing of data between the corresponding components 51 and/or elements. For example, enterprise application view 60 can display a representation of the components and data flow for processing a particular transaction (e.g., an electronic commerce purchase).

Figure 4:
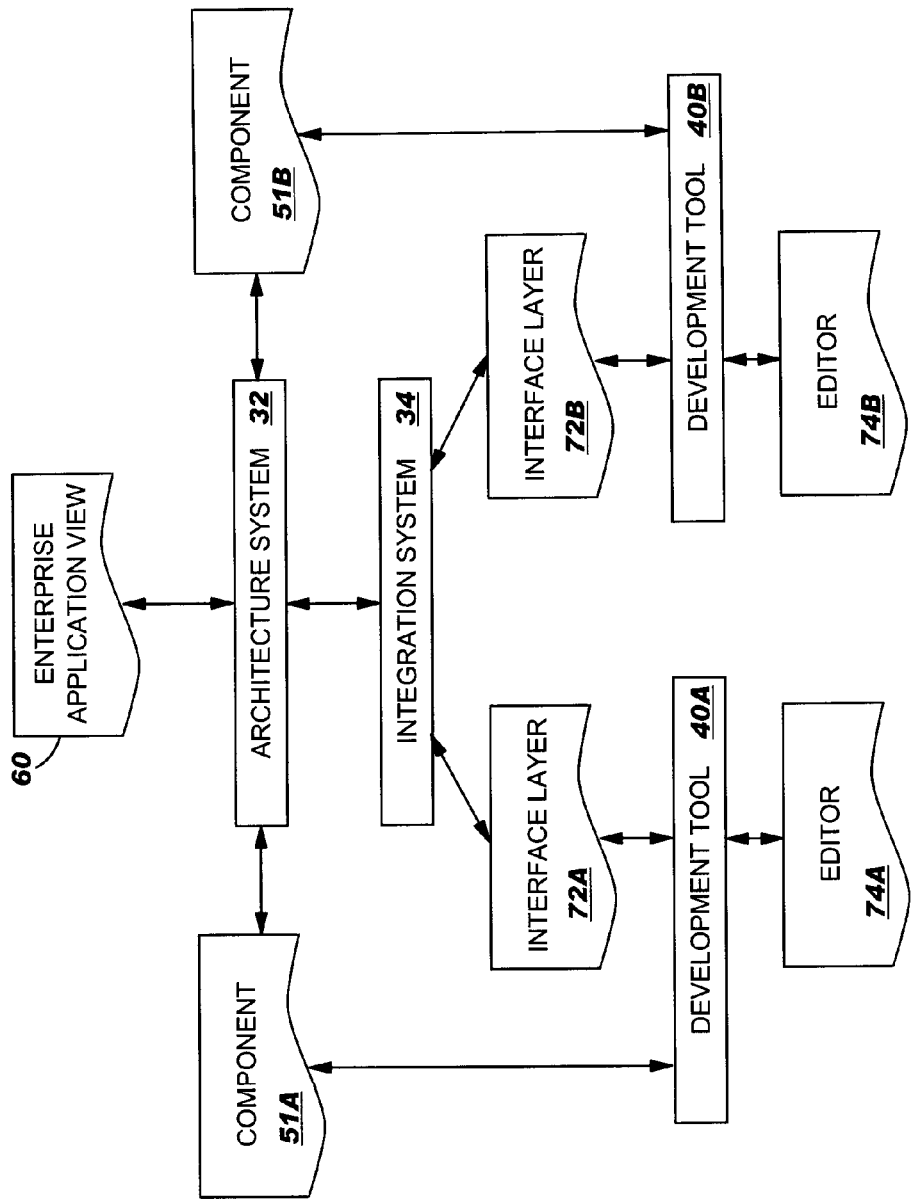
FIG. 4 shows an illustrative flow diagram between the various systems shown in FIG.

As previously mentioned, workbench 58 can enable the integration of enterprise application view 60 with one or more development tools 40 and their corresponding editors 74A-B. To this extent, enterprise IDE system 30 can comprise an integration system 34 that integrates each of the plurality of development tools 40 with enterprise application view 60. For example, FIG. 4 shows an illustrative flow diagram between the various systems shown in FIG. 1. As shown in FIG. 4, both architecture system 32 and development tools 40A-B can create, delete, and/or modify components 51A-B. Further, integration system 34 is shown enabling the integration of architecture system 32 (and enterprise application view 60) and development tools 40A-B (and editors 74A-B).

In one embodiment, integration system 34 manages a set (one or more) of interface layers 72A-B that enable data on events received from enterprise application view 60 to be forwarded to a corresponding development tool 40A-B, which in turn processes the event data for a corresponding editor 74A-B. Similarly, interface layers 72A-B can receive events from editors 74A-B and forward data on the events to architecture system 32, which in turn processes the event data for enterprise application view 60. As shown, integration system 34 can manage a unique interface layer 72A-B for each development tool 40A-B. Alternatively, a single interface layer 72A-B could be used to integrate a plurality of development tools 40A-B. In any event, each interface layer 72A-B comprises a set of helper and/or synchronization classes that map one or more model objects used by development tool 40A-B to manage the development of each component 51A-B to the corresponding object 64A-D (FIG. 3) in enterprise application view 60 that represents the component 51A-B. In one embodiment, each interface layer 72A-B utilizes various functions exposed in an application programming interface (API) for each development tool 40A-B to implement the mapping.

Referring to FIGS. 3 and 4, user 16 (FIG. 1) can perform various top-down development functions in an integrated manner using workbench 58 and architecture system 32, integration system 34, and development tools 40A-B. For example, user 16 can use enterprise application view 60 to request that a new component 51A-B be added to enterprise application 50. In particular, enterprise application view 60 is shown including a component selection area 66 that enables user 16 to selectively add one or more components 51A-B of a particular component type to a desired logical tier 52A-C (FIG. 2). In one embodiment, user 16 could select a component type in selection area 66 and "drag and drop" an object 64A-D representing the component type to a desired location in one of the display areas 62A-C. In this case, architecture system 32 can receive a request to generate a new component 51A-B that corresponds to the object 64A-D in the logical tier 52A-C that corresponds to the display area 62A-C. In response, architecture system 32 can generate a blank or a default component 51A-B of the corresponding component type to the appropriate logical tier 52A-C for enterprise application 50. Architecture system 32 can automatically obtain various data for the new component 51A-B based on the component type (e.g., an associated development tool 40A-B) and/or obtain various data from user 16 in a known manner (e.g., a popup window that allows user 16 to specify a name).

Similarly, user 16 (FIG. 1) can define dependency data for one or more components 51A-B using enterprise application view 60. For example, enterprise application view 60 can comprise a dependency area 68 that enables user 16 to select a particular dependency and add it to enterprise application view 60. To this extent, user 16 could select to add a connection dependency 70A between objects 64A-D by selecting the connection dependency in dependency area 68, and connecting objects 64A-D in any known manner. In response, architecture system 32 can add the dependency data for the components 51A-B that correspond to objects 64A-D. Subsequently, architecture system 32 can generate a popup window or the like to enable user 16 to enter additional details of the new dependency (e.g., sending/receiving data or the like).

User 16 (FIG. 1) can generate numerous additional top-down development events using enterprise application view 60. For example, user 16 can select a particular object 64A-D, delete one or more objects 64A-D and/or connections 70A-B, move an object 64A-D from one tier to another, or the like. In response, architecture system 32 can take the appropriate action with respect to the underlying components 51A-B and/or enterprise application 50 (FIG. 1). Additionally, architecture system 32 can forward data about one or more of these events to integration system 34 for further processing by an appropriate development tool 40A-B.

For example, user 16 (FIG. 1) can generate a selection event for an object 64A-D in enterprise application view 60 by, for example, clicking on object 64A. In response, architecture system 32 can receive the selection event and determine a component 51A of enterprise application 50 (FIG. 1) that corresponds to the selected object 64A. Data on the selection event and the corresponding component 51A can be forwarded to integration system 34. Based on the selection event and component 51A, integration system 34 can use interface layer 72A to inform a development tool 40A for the particular component 51A of the event and/or request that the development tool 40A perform some action in response to the event.

Development tool 40A can perform various actions in response to an event generated in enterprise application view 60. For example, when development tool 40A receives a selection event for a component 51A that is not currently being displayed/edited, development tool 40A may take no action. Alternatively, development tool 40A could initiate an editor 74A and display data for the selected component 51A within the editor 74A. Further, data displayed within an existing editor 74A can be modified based on the component 51A and the selection event. For example, an object within the editor 74A that corresponds to the selected component can be highlighted. To this extent, editor 74A is shown having a highlighted object 164A that corresponds to the same component 51A as the highlighted object 64A in enterprise application view 60. In this manner, the operation of both enterprise application view 60 and editors 74A-B can be integrated.

Similarly, various bottom-up development functions can be implemented by development tool 40A-B, integration system 34, and architecture system 32. For example, user 16 (FIG. 1) could request to create a new component 51A-B using an editor 74A-B. In particular, user 16 could request to create the component 51A that corresponds to object 164A using editor 74A. In response, development tool 40B can generate the new component 51A and display object 164A in editor 74A. To this extent, development tool 40A can automatically determine the appropriate logical tier 52A-C (FIG. 2) within which the new component 51A should be placed. For example, development tool 40A may only be used to edit components 51A within a particular logical tier 52A-C, the new component 51A may be added to a set of components 51A within a particular logical tier 52A-C, or the like. Alternatively, user 16 could specify the appropriate logical tier 52A-C for the new component 51A.

Regardless, using interface layer 72A-B, integration system 34 can detect the creation event and forward data on the event and the corresponding component 51A to architecture system 32. In response, architecture system 32 can automatically add an object 64A for the new component 51A to the appropriate display area 62A. In another embodiment, rather than automatically adding object 64A to enterprise application view 60, user 16 (FIG. 1) could "drag and drop" object 164A from editor 74A to a desired display area 62A-C within enterprise application view 60. In response to the drag and drop request, integration system 34 can use interface layer 72A to obtain the component 51A that corresponds to object 164A, and architecture system 32 can generate an appropriate object 64A in response to the request.

Additionally, integration system 34 can use interface layers 72A-B to monitor various other types of events that occur within editors 74A-B and forward data about the events to architecture system 32 for further processing. For example, user 16 (FIG. 1) could select object 164A in editor 74A. This selection event could be detected by interface layer 72A and integration system 32 can forward the event and the corresponding component 51A to architecture system 32 for further processing. In response, architecture system 32 could highlight the object 64A in enterprise application view 60 that corresponds to the selected component 51A.

As a result, workbench 58, enterprise application view 60, and editors 74A-B enable a set of users 16 (FIG. 1) to develop the various components 51A-B for enterprise application 50 (FIG. 1) in a top-down, bottom-up, and/or iterative manner. It is understood, however, that the various functions described herein are only illustrative of the numerous functions that can be implemented using the invention. For example, user 16 can request a reference check for a particular component to determine the location of its definition and/or locations that reference the component. Further, one or more attributes of an object displayed in workbench 58 could be altered based on its development status (e.g., defined but not created). Still further, an interdependency analyzer can be implemented to determine the dependencies of one or more components, a preview of data transformation and mapping can be generated, a test environment for validation and/or verification against a runtime can be implemented, and/or the like.

Returning to FIG. 1, once the development of components 51 has completed, user 16 can generate a deployment request (e.g., using workbench 58 of FIG. 3 or the like) that is received by deployment system 36. In response, deployment system 36 can generate enterprise application 50 based on components 51. In particular, for each component 51 that has been modified since a previous deployment, deployment system 36 can generate the program code based on the current version of the component 51. Subsequently, deployment system 36 can deploy enterprise application 50. To this extent, deployment system 36 can maintain the location(s) and other deployment information for each component 51, and once generated, the program code can be provided for installation at the correct location(s).

Further, when user 16 determines that a deployment was performed in error, user 16 can generate a rollback request for the deployment to be rolled back. After receiving the rollback request, deployment system 36 can roll back the deployed enterprise application 50 in response. In particular, deployment system 36 can remove the updated program code and/or other deployment information that was previously provided during the deployment. To this extent, deployment system 36 can maintain the program code and other information for one or more previous versions of the deployed enterprise application 50 so that the previous deployment of enterprise application 50 can be reinstated as part of rolling back the deployed enterprise application 50.

While shown and described herein as a method, system and IDE for managing development of an enterprise application, it is understood that the invention further provides various alternative embodiments. For example, in one embodiment, the invention provides a computer-readable medium that includes computer program code to enable a computer infrastructure to manage development of an enterprise application. To this extent, the computer-readable medium includes program code, such as enterprise IDE system 30 (FIG. 1), that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to manage development of an enterprise application as described above. In this case, the service provider can create, maintain, support, etc., a computer infrastructure, such as computer infrastructure 12 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for managing development of an enterprise application. In this case, a computer infrastructure, such as computer infrastructure 12 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing development of an enterprise application, the method comprising:
   generating an enterprise application view that includes a unique display area for each of a plurality of logical tiers for the enterprise application, wherein each unique display area includes a set of objects that represent at least one of a corresponding unique set of components for each of the plurality of logical tiers, wherein each component provides functionality used by the enterprise application;
   providing the enterprise application view for display to a user; and
   managing a set of interface layers for enabling the enterprise application view to interface with a set of development tools, wherein each development tool manages development of a different component of a corresponding component type using one or more of a set of editors, distinct from the enterprise application view, each of the editors displays and edits data used to generate a corresponding component of a corresponding component type prior to deployment using a deployment tool, and each interface layer provides a mapping that enables an exchange of data on events between the enterprise application view and a corresponding one of the a set of editors for at least one of the set of development tools using an application programming interface and an integrated response to the events by the enterprise application view and the a set of editors, wherein the events include selection events received from the enterprise application view and the a set of editors.

2. The method of claim 1, further comprising:
   receiving a selection event for an object from the enterprise application view; and
   determining a component that corresponds to the object.

3. The method of claim 2, further comprising initiating the at least one editor based for editing data used to generate the component.

4. The method of claim 2, further comprising modifying data in the at least one editor for editing data used to generate the component based on the component and the selection event.

5. The method of claim 1, wherein the generating step includes:
   obtaining dependency data for each component; and
   adding the dependency data to the enterprise application view.

6. The method of claim 1, further comprising:
   receiving a request to generate a new object within one of the unique display areas;
   generating a new component based on the new object; and
   adding the new object to the one of the unique display areas.

7. The method of claim 1, further comprising:
   receiving a request to add a component to one of the plurality of logical tiers; and
   adding an object for the component to the unique display area for the one of the plurality of logical tiers in response to the request.

8. The method of claim 1, further comprising:
   receiving a deployment request;
   generating the enterprise application based on the sets of components; and
   deploying the enterprise application.

9. The method of claim 8, further comprising:
   receiving a rollback request; and
   rolling back the deployed enterprise application in response to the rollback request.

10. The method of claim 1, wherein each interface layer corresponds to a unique one of the set of development tools, and includes a set of classes that map a set of model objects used by the one of the set of development tools to represent a component to an object in the enterprise application view that represents the component.

11. A system for managing development of an enterprise application, the system comprising:
    at least one computing device including:
    a system for generating an enterprise application view that includes a unique display area for each of a plurality of logical tiers, wherein each unique display area includes a set of objects that represent at least one of a corresponding unique set of components for each of the plurality of logical tiers,
    wherein each component provides functionality used by the enterprise application;
    a system for providing the enterprise application view for display to a user; and
    a system for managing a set of interface layers for enabling the enterprise application view to interface with a set of development tools, each development tool including a set of editors, distinct from the enterprise application view, each development tool being used to develop a component of a corresponding component type prior to deployment using a deployment tool, and each interface layer enabling an exchange of data on events between the enterprise application view and the set of editors for at least one of the set of development tools using an application programming interface and an integrated response to the events by the enterprise application view and the set of editors, wherein the events include selection events received from the enterprise application view and the set of editors.

12. The system of claim 11, the at least one computing device further including the set of development tools.

13. The system of claim 11, the at least one computing device further including a system for deploying the enterprise application.

14. The system of claim 13, the at least one computing device further including a system for rolling back a deployment of the enterprise application.

15. The system of claim 11, the at least one computing device further including a system for generating the enterprise application based on the sets of components.

16. An integrated development environment (IDE) embodied in a computer-readable storage medium for enabling a computer infrastructure to manage development of an enterprise application, the IDE comprising:
    a system for managing a plurality of logical tiers for the enterprise application;
    a system for managing a plurality of components for the enterprise application,
    wherein each component comprises one of a plurality of component types and belongs to one of the plurality of logical tiers, and wherein each component provides functionality used by the enterprise application;

a plurality of development tools, wherein each development tool manages development, prior to deployment using a deployment tool, of a component of a corresponding component type using a set of editors, distinct from the enterprise application view, each of the editors displaying and editing data used to generate the component of the corresponding component type;

a system for generating an enterprise application view based on the plurality of logical tiers and the plurality of components and providing the enterprise application view for display to a user, wherein the enterprise application view includes a set of objects that represent at least one of a corresponding unique set of components for each of the plurality of logical tiers; and a system for integrating each of the plurality of development tools with the enterprise application view, the system for integrating enabling an exchange of data on events between the enterprise application view and the set of editors for at least one of the set of development tools using an application programming interface and an integrated response to the events by the enterprise application view and the set of editors, wherein the events include selection events received from the enterprise application view and the set of editors.

17. The IDE of claim 16, further comprising a system for generating the enterprise application based on the sets of components.

18. The IDE of claim 16, further comprising a system for deploying the enterprise application.

19. The IDE of claim 18, further comprising a system for rolling back a deployment of the enterprise application.

20. The IDE of claim 16, wherein the enterprise application view includes a unique display area for each of the plurality of logical tiers.

* * * * *